Sept. 16, 1952      J. W. ROWLAND      2,610,469
FLUID PRESSURE BOOSTER THROUGH DIFFERENTIAL
LEVER AND EQUIVALENT STRUCTURE
Filed Sept. 9, 1949
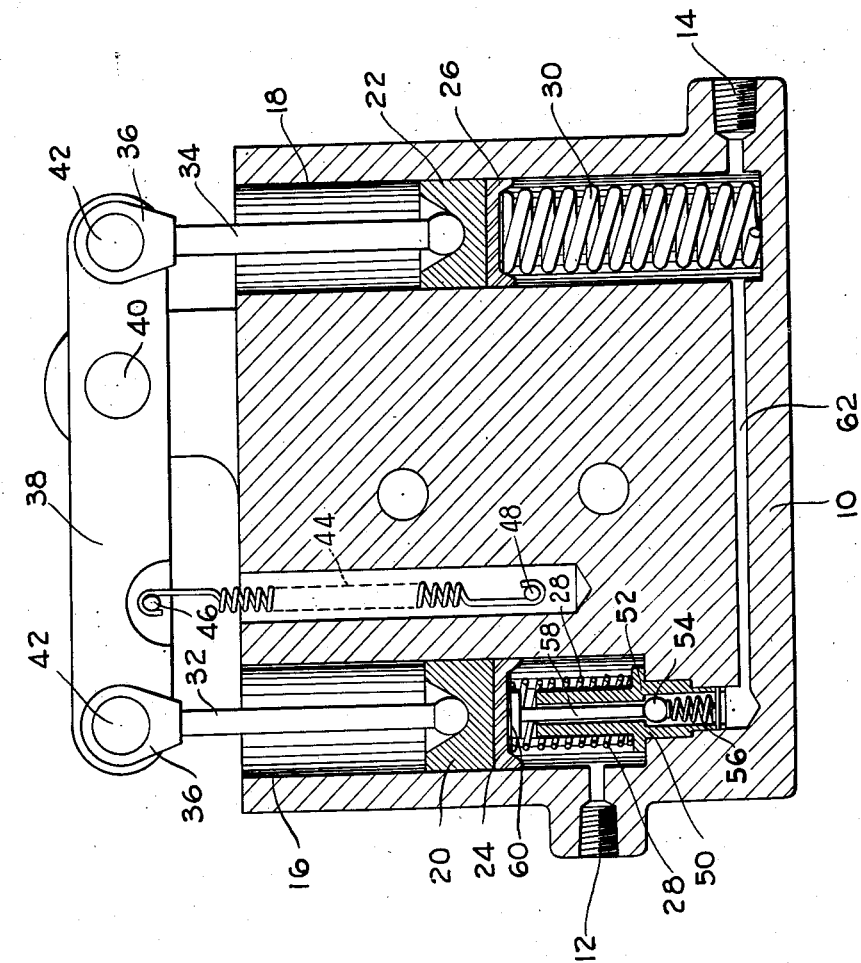
INVENTOR
JAMES W. ROWLAND
BY Beaman & Patch
ATTORNEY Patented Sept. 16, 1952

2,610,469

UNITED STATES PATENT OFFICE 2,610,469

FLUID PRESSURE BOOSTER THROUGH DIFFERENTIAL LEVER AND EQUIVALENT STRUCTURE

James W. Rowland, Jackson, Mich.

Application September 9, 1949, Serial No. 114,770

4 Claims. (Cl. 60—54.6)

The present invention relates to improvements in fluid pressure boosters.

It has been found that the principles of the invention have useful application to the general field of fluids, wherein a source of relatively low fluid pressure is available and a higher delivered fluid pressure is desirable. Where the higher delivered fluid pressure may be of relatively smaller volume, the invention has been found to be particularly well adapted.

By way of example, the invention finds application as a booster in hydraulic brake systems. Initial displacement of the fluid at low pressure will take up the clearance by moving the brake element into position to engage with the brake drum, and thereafter the pressure boosting action is effected.

Another object of the invention is to provide a relatively inexpensive fluid pressure booster which is well adapted for use with machine tools wherein rapid traverse of a part may be accomplished by the displacement of a relatively large volume of fluid at low pressure with the work being accomplished by a relatively small volume of fluid placed at a higher pressure. Other fields of application of this principle will readily appear to those skilled in the art.

A further object of the invention is to provide a fluid pressure booster in which movable wall structures connected with mechanical advantage mechanism are subjected to a relatively low fluid pressure on one side and deliver relatively higher fluid pressure on the other side.

A still further object of the invention is to provide a booster for fluid pressure in which a valved fluid conduit is provided for the flow of fluid pressure to and fro, there being mechanical advantage means operatively coupled to the fluid passage upon opposite side of the valve structure for delivering fluid at a higher pressure under the influence of a source of lower pressure.

These and other objects of the invention residing in the specific arrangement, combination and construction of parts will be more fully appreciated from a consideration of the following specification and claims.

In the drawing a single embodiment of the principles of the invention is illustrated in a booster unit of simplified construction shown in vertical cross section.

In the illustrated form of my fluid pressure booster, the unit 10 is shown in the form of a cast or otherwise fabricated body member having a fluid inlet connection 12 adapted to be connected to any suitable source of low fluid pressure, and an outlet connection 14 from which fluid pressure is delivered at both high pressure and low pressure. For the purpose of description and by way of example only, the connection 12 may be considered as directly associated with the delivery side of a relatively low pressure master cylinder as found on trucks, automobiles, and busses with the outlet connection 14 coupled to the wheel cylinders of the brakes.

Parallel cylindrical bores 16 and 18 are defined in the body unit 10, in which pistons 20 and 22 operate. Suitable packing 24 and 26 seal the pistons 20 and 22 for movement in the bores 16 and 18 with the assistance of the springs 28 and 30.

The push rods 32 and 34 are provided with clevis 36 at the upper ends and they are connected by pins 42 to the rocker beam 38 which is pivotally supported on the pin 40. A return spring 44 of suitable construction is connected with the beam 38 and the body of the unit 10 by pins 46 and 48.

Press fitted in a reduced cylindrical extension of the bore 16 is a combination guide and valve part 50, having a seat portion 52 with which a ball valve 54 engages. A spring 56 urges the ball valve 54 toward the seat 52. In the at rest position of the unit 10 shown in the drawing, a rod 58 is shown loosely guided in the bore of the part 50 with its upper end portion 60 engaged with the piston 20 through the packing 24. The tension of the return spring 44 is such that the piston 20 is lowered sufficiently to force the rod 58 against the ball 54 to unseat it while the unit 10 is at rest or is not functioning to boost the fluid pressure. The bores 16 and 18 are in fluid communication with each other through the passage 60.

To describe the principles of operation of the present invention in connection with its use in a hydraulic brake system, displacement of liquid under relatively low pressure from the master cylinder causes the flow of liquid through the connection 12, into the bore 16, around the rod 58 which is holding the valve 54 from its seat, through the passage 62 into the bore 18 below the cylinder 22 and out through the connection 14 to the wheel cylinder where the low pressure is adequate to take up the clearance between the brake band and the brake drum and under such conditions to make the initial application of the brake.

When sufficient low pressure has been built up against the piston 20 to overcome the springs 30 and 44 due to the differential in length of the portions of the beam 38 on the opposite side of the pin 40, the piston 20 is elevated to permit the valve 54 to close. The brake fluid is now trapped on the booster side of the check valve 54. Continued displacement of the piston 20 by relatively low fluid pressure directed through the inlet connection 12 will rock the beam 38 clockwise lowering the piston 22 with mechanical advantage to build up the pressure of the liquid being displaced through the outlet connection 14.

Upon the release of the application of low pressure fluid against the piston 20, the return spring 44 will lower the piston 20 sufficiently to depress the rod 58 to move the ball valve 54 from its seat whereby a return flow of fluid will take place past the valve 54 and the pressure will be equalized in the bores 16 and 18.

It will be readily understood that diaphragms or other equivalent movable wall structure may replace the pistons 20 and 22 connected together with other known types of mechanical advantage structure. By changing the location of the pin 40 along the beam 38 and altering the relative sizes of the pistons 20 and 22, the degree of pressure boosting may be varied with corresponding changes in the ratio of the volume of fluid displaced.

I claim:

1. A fluid pressure booster unit comprising a body portion having fluid chambers defined therein with movable wall structures, differential lever mechanism connected between said wall structures whereby displacement of one wall structure results in the displacement of the connected wall structure, a fluid conduit extending between said chambers, a check valve and seat in said conduit to prevent movement of fluid in said conduit in one direction with said valve engaging said seat, and means for moving said valve from said seat to permit a return flow of fluid past said valve to equalize pressure in said chambers following a development of differential pressures therein by displacement of said wall structures through said differential lever mechanism.

2. A fluid pressure booster unit as defined in claim 1 wherein means are provided for holding said check valve open with the fluid pressures in said chambers equalized and prior to initial displacement of said wall structures.

3. A fluid pressure booster unit as defined in claim 1 wherein an operative connection is provided between one of said wall structures and said check valve for holding said check valve open when the pressure is equalized in said chambers and pending initial replacement movement of said wall structures.

4. A fluid pressure booster unit comprising a body portion having fluid chambers defined therein with movable wall structures, differential lever mechanism connected between said wall structures actuated solely by fluid pressure, whereby displacement of one wall structure by fluid pressure results in the displacement of the connected wall structure and the displacement of fluid pressure in the chamber associated therewith, said mechanism including lever portions of different length extending in opposite directions from a common pivot, rods connecting the outer ends of said lever portions and said wall structures, a fluid connection with one of said chambers for admitting fluid under pressure, and a fluid connection with the other of said chambers for the displacement of fluid therefrom.

JAMES W. ROWLAND.

REFERENCES CITED

The following references are of record in the file of this patent:

UNITED STATES PATENTS

| Number | Name | Date |
| --- | --- | --- |
| 1,430,746 | Loughead | Oct. 3, 1922 |
| 1,954,039 | Campbell | Apr. 10, 1934 |
| 2,197,126 | Dick | Apr. 16, 1940 |
| 2,359,687 | Stelzer | Oct. 3, 1944 |
| 2,414,302 | Hebel | Jan. 14, 1947 |

FOREIGN PATENTS

| Number | Country | Date |
| --- | --- | --- |
| 598,479 | France | Sept. 28, 1925 |